United States Patent
Takahashi

(10) Patent No.: US 12,442,702 B2
(45) Date of Patent: Oct. 14, 2025

(54) DYNAMOMETER SYSTEM

(71) Applicant: MEIDENSHA CORPORATION, Tokyo (JP)

(72) Inventor: Toshimichi Takahashi, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/875,615

(22) PCT Filed: Jun. 13, 2023

(86) PCT No.: PCT/JP2023/021951
§ 371 (c)(1),
(2) Date: Dec. 16, 2024

(87) PCT Pub. No.: WO2023/243638
PCT Pub. Date: Dec. 21, 2023

(65) Prior Publication Data
US 2025/0172445 A1 May 29, 2025

(30) Foreign Application Priority Data
Jun. 15, 2022 (JP) .................. 2022-096810

(51) Int. Cl.
*G01L 3/16* (2006.01)
*G01M 17/03* (2006.01)

(52) U.S. Cl.
CPC .............. *G01L 3/16* (2013.01); *G01M 17/03* (2013.01)

(58) Field of Classification Search
None
See application file for complete search history.

(56) References Cited

U.S. PATENT DOCUMENTS 4,064,704 A * 12/1977 Blackburn ............. G01H 1/003
702/56
4,989,458 A * 2/1991 Suzuki ...................... G01L 3/16
73/862.17

(Continued)

FOREIGN PATENT DOCUMENTS

JP 2013246152 A * 12/2013 ............... G01L 3/22
JP 2016-70786 A 5/2016

(Continued)

OTHER PUBLICATIONS

JP2013246152A translation (Year: 2013).*

*Primary Examiner* — Lina Cordero
(74) *Attorney, Agent, or Firm* — MUNCY, GEISSLER, OLDS & LOWE, P.C.

(57) ABSTRACT

A control device (4) for this dynamometer system comprises: a feedback controller (50) that generates a feedback input signal on the basis of a torque detection signal and a feedback command signal; a natural vibration suppression circuit (52) that generates a correction signal so that natural vibration of a vibration element is suppressed; an inverter input generation unit (53) that generates an inverter input signal on the basis of the feedback input signal and the correction signal; and a command generation unit (7) that generates the feedback command signal on the basis of the torque detection signal and a speed detection signal. The command generation unit (7) generates the feedback input signal from a signal generated on the basis of the speed detection signal and the torque detection signal through band stop processing that attenuates a component within a stop band.

10 Claims, 4 Drawing Sheets

(56) References Cited

U.S. PATENT DOCUMENTS

2015/0219510 A1* 8/2015 Takahashi ............... G01L 3/22
                                                    702/41
2016/0204724 A1* 7/2016 Spielmann ............. H02P 9/04
                                                    290/40 A
2020/0200627 A1   6/2020 Takahashi

FOREIGN PATENT DOCUMENTS

WO    WO2016/052084 A1    4/2016
WO    WO2018/207832 A1    11/2018

* cited by examiner

DYNAMOMETER SYSTEM

TECHNICAL FIELD

The present invention relates to a dynamometer system. More specifically, the present invention relates to a dynamometer system including an oscillating dynamometer.

BACKGROUND ART

In dynamometer systems such as engine dynamometer systems, chassis dynamometer systems, and powertrain systems equipped with an oscillating dynamometer, a load cell is used as a sensor for detecting torque related to control and measurement thereof. The load cell detects the torque acting on the oscillator of the dynamometer via a torque arm extending from the oscillator (refer to Patent Document 1). Due to such a structure, the output signal of the load cell is obtained by superimposing a torque fluctuation component accompanying the natural vibration of an oscillator, in addition to the torque actually detected by the dynamometer, and this fluctuation component is basically an unnecessary component in the control and measurement of the system.

Patent Document 1 describes a control method of suppressing the natural vibration of an oscillator by applying damping to a control target using a natural vibration suppression circuit. Since the natural vibration of the oscillator is suppressed by using the natural vibration suppression circuit of Patent Document 1, a stable detection signal in which the natural vibration is suppressed can be obtained in the load cell.

CITATION LIST

Patent Document

Patent Document 1: Japanese Unexamined Patent Application, Publication No. 2016-70786

DISCLOSURE OF THE INVENTION

Problems to be Solved by the Invention

However, when the natural vibration suppression circuit as shown in Patent Document 1 is used, while the natural vibration of the oscillator can be suppressed, other vibrations remarkably appear. Patent Document 1 discloses a technique of suppressing the influence of vibration caused by torque ripple of an inverter supplying electric power to a dynamometer, but does not consider the influence of vibration caused by a mechanical device of a dynamometer system. Therefore, in the technique shown in Patent Document 1, as shown in FIG. 3A to be described later, the vibration is amplified in a specific frequency region, and as a result, measurement accuracy of the dynamometer system may be adversely affected.

An object of the present invention is to provide a dynamometer system capable of performing control of suppressing the influence of the natural vibration of an oscillator and a vibration caused by a mechanical device different from the natural vibration.

Means for Solving the Problems (1) A dynamometer system according to the present invention (for example, a dynamometer system 1 described later) includes: an oscillating dynamometer main body (for example, a dynamometer main body 2 described later); an inverter (for example, an inverter 3 described later) that supplies electric power corresponding to an inverter input signal to the dynamometer main body; a torque detector (for example, a torque detection circuit 6 described later) that generates a torque detection signal corresponding to a torque generated in an oscillator of the dynamometer main body; a speed detector (for example, a speed detection device 29 described later) that generates a speed detection signal corresponding to a rotation speed of an output shaft of the dynamometer main body; and a controller (for example, a control device 4, 4A described later) that generates the inverter input signal based on the torque detection signal and the speed detection signal, and inputs the inverter input signal to the inverter, in which the controller includes: a feedback controller (for example, a feedback controller 50, 50A described later) that generates a feedback input signal based on a deviation between a detection signal, which is either one of the torque detection signal or the speed detection signal, and a feedback command signal for the detection signal; a natural vibration suppression circuit (for example, a natural vibration suppression circuit 52 described later) that generates a correction signal for the feedback input signal to suppress a natural vibration of the oscillator based on the inverter input signal; an inverter input generator (for example, an inverter input generation unit 53 described later) that generates the inverter input signal based on the feedback input signal and the correction signal; and a command generator (for example, a command generation unit 7, 7A described later) that generates the feedback command signal based on the torque detection signal and the speed detection signal, and in which the command generator generates the feedback command signal from the speed detection signal, the torque detection signal, or a signal generated based on at least one of the speed detection signal or the torque detection signal, through band stop processing that attenuates a component within a predetermined stop band and allows a component outside the stop band to pass through.

(2) In this case, it is preferable that a center frequency of the stop band is variably set to a magnitude proportional to the rotation speed.

(3) In this case, it is preferable that the command generator includes a driving force observer (for example, a driving force observer 71 described later) that generates a driving force estimation signal corresponding to a driving force applied to the dynamometer main body based on the speed detection signal and the torque detection signal, a travel resistance setting unit (for example, a travel resistance setting unit 70 described later) that generates a travel resistance setting signal based on the speed detection signal, and at least one notch filter (for example, a notch filter 75, a first notch filter 75A, and a second notch filter 75B described later) that performs the band stop processing on the driving force estimation signal and the travel resistance setting signal.

(4) In this case, it is preferable that the command generator includes a driving force observer (for example, a driving force observer 71 described later) that generates a driving force estimation signal corresponding to a driving force applied to the dynamometer main body based on the speed detection signal and the torque detection signal, a travel resistance setting unit (for example, a travel resistance setting unit 70 described later) that generates a travel resistance setting signal based on the speed detection signal, a first notch filter (for example, a first notch filter 75A described later) that performs the band stop processing on the speed detection signal inputted to the driving force observer and the travel resistance setting unit, and a second notch filter (for example, a second notch filter 75B described later) that performs the band stop processing on the torque detection signal inputted to the driving force observer.

Effects of the Invention (1) A dynamometer system according to the present invention includes an oscillating dynamometer main body, an inverter that supplies electric power corresponding to an inverter input signal to the dynamometer main body, and a control device that generates an inverter input signal based on a torque detection signal and a speed detection signal. Further, the control device includes: a feedback controller that generates a feedback input signal based on a deviation between a detection signal, which is either of the torque detection signal or the speed detection signal, and a feedback command signal for the detection signal; a command generation unit that generates the feedback command signal for this feedback controller; a natural vibration suppression circuit that generates a correction signal for the feedback input signal to suppress a natural vibration of the oscillator; and an inverter input generation unit that generates the inverter input signal based on the feedback input signal and the correction signal. As described above, the control device can suppress the natural vibration of the oscillator by generating the correction signal for the feedback input signal using the natural vibration suppression circuit and generating the inverter input signal using the feedback input signal and the correction signal. Further, in the present invention, the command generation unit generates the feedback command signal from the speed detection signal, the torque detection signal, or a signal generated based on at least one of the speed detection signal or the torque detection signal, through band stop processing that attenuates a component within a predetermined stop band and allows a component outside the stop band to pass through. With such a configuration, since it is possible for the control device to selectively attenuate the fluctuation component in the stop band from the feedback command signal inputted to the feedback controller, it is possible to realize control of the dynamometer main body in which the influence of the natural vibration of the oscillator and the vibration caused by the mechanical device different from the natural vibration is suppressed.

(2) According to the present invention, by variably setting the center frequency of the stop band to a magnitude proportional to the rotation speed, it is possible to suppress the influence of vibration generated in the speed detection signal and the torque detection signal due to, for example, eccentricity of the output shaft to which the speed detection device is attached.

(3) In the present invention, the command generation unit includes a driving force observer that generates a driving force estimation signal based on the speed detection signal and the torque detection signal, a travel resistance setting unit that generates a travel resistance setting signal based on the speed detection signal, and at least one notch filter that performs band stop processing on the driving force estimation signal and the travel resistance setting signal. According to the present invention, by performing the band stop processing on the driving force estimation signal and the travel resistance setting signal used to generate the feedback command signal in the command generation unit, it is possible to selectively attenuate the fluctuation component in the stop band from the feedback command signal inputted to the feedback controller, and therefore, it is possible to realize control of the dynamometer main body in which the influence of vibration caused by a mechanical device different from the natural vibration of the oscillator is suppressed.

(4) In the present invention, the command generation unit includes a driving force observer that generates a driving force estimation signal based on the speed detection signal and the torque detection signal, a travel resistance setting unit that generates a travel resistance setting signal based on the speed detection signal, a first notch filter that performs the band stop processing on the speed detection signal inputted to the driving force observer and the travel resistance setting unit, and a second notch filter that performs the band stop processing on the torque detection signal inputted to the driving force observer. According to the present invention, in the command generation unit, the band stop processing is performed on the feedback command signal, and thus the speed detection signal and the torque detection signal used to generate the driving force estimation signal and the travel resistance setting signal, such that the fluctuation component in the stop band can be selectively attenuated from the feedback command signal inputted to the feedback controller. Therefore, it is possible to realize control of the dynamometer main body in which the influence of the vibration caused by a mechanical device different from the natural vibration of the oscillator is suppressed.

PREFERRED MODE FOR CARRYING OUT THE INVENTION

Figure 1:
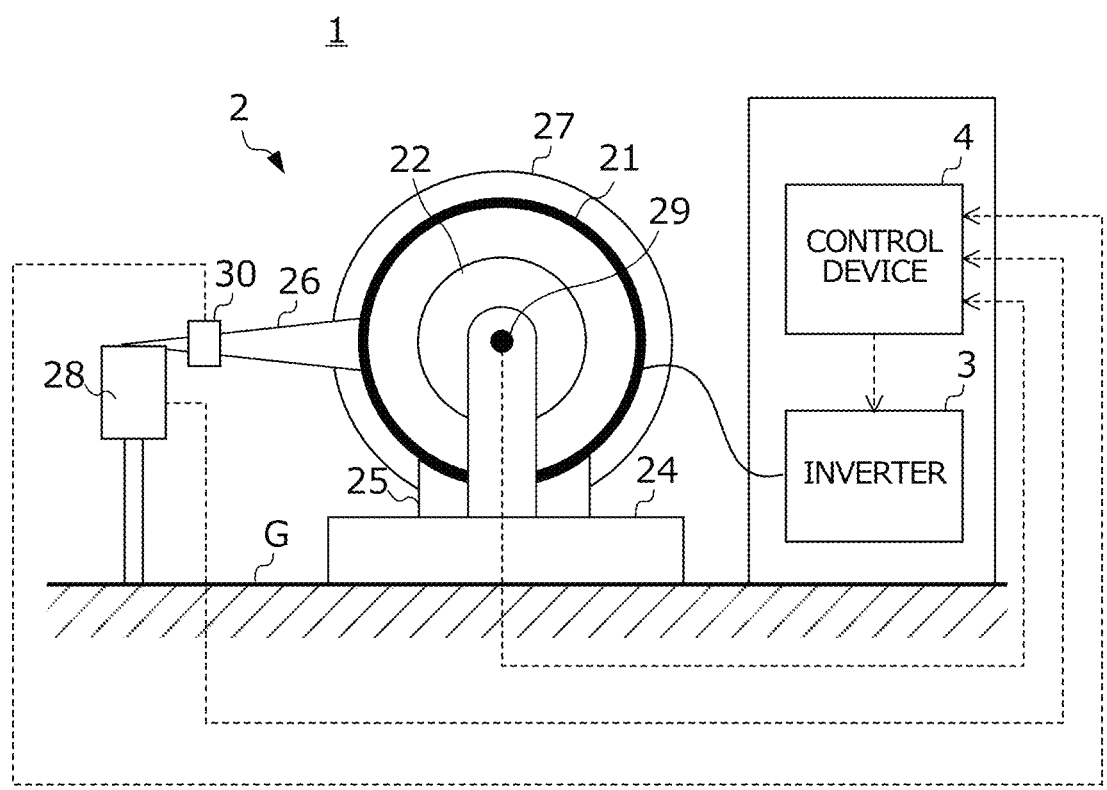
FIG. 1 is a diagram showing a configuration of an oscillating dynamometer system according to an embodiment of the present invention.

Hereinafter, embodiments of the present invention will be described with reference to the drawings. FIG. 1 is a diagram illustrating a configuration of a dynamometer system 1. The dynamometer system 1 includes an oscillating dynamometer main body 2, a roller 27, a flywheel, or the like (not shown) provided as a load on an output shaft 22 of the dynamometer main body 2, an inverter 3 that supplies electric power corresponding to an inverter input signal to the dynamometer main body 2, and a control device 4 that generates an inverter input signal and inputs the inverter input signal to the inverter 3.

The dynamometer main body 2 includes a cylindrical oscillator 21, an output shaft 22 rotatably supported in the oscillator 21, a pedestal 25 that supports the oscillator 21 in an oscillating manner along the circumferential direction on a base 24 fixed to the installation surface G, a load cell 28 that detects torque generated in the oscillator 21, and a speed detection device 29 that detects the revolution speed of the output shaft 22.

A torque arm 26 extending outward along the radial direction is provided on a lateral portion of the oscillator 21. The load cell 28 is provided between the tip portion of the torque arm 26 and the installation surface G. The load cell 28 transmits a load cell detection signal corresponding to a load acting between the torque arm 26 and the installation surface G to the control device 4.

Further, the tip portion of the torque arm 26 includes an acceleration sensor 30 for detecting the acceleration of the torque arm 26. The acceleration sensor 30 transmits an acceleration detection signal corresponding to the acceleration of the torque arm 26 along the load direction of the load cell 28 to the control device 4. The speed detection device 29 is attached to the output shaft 22, and transmits a speed detection signal corresponding to the rotation speed of the output shaft 22 to the control device 4.

A drive wheel (not shown) of a vehicle as an object to be tested by the dynamometer system 1 is placed on the roller 27.

The control device 4 generates an inverter input signal for the dynamometer main body 2 based on detection signals of the load cell 28, the speed detection device 29, the acceleration sensor 30, and the like, and inputs the inverter input signal to the inverter 3. More specifically, the control device 4 performs various tests such as an exhaust gas test and a fuel consumption test while adding an inertia equivalent to an actual vehicle to the vehicle mounted on the roller 27 and simulating actual road traveling by using a control circuit such as that described below.

Hereinafter, the configuration of the control device 4 of the oscillating dynamometer system 1 as described above will be described for each example.

FIRST EXAMPLE

Figure 2:
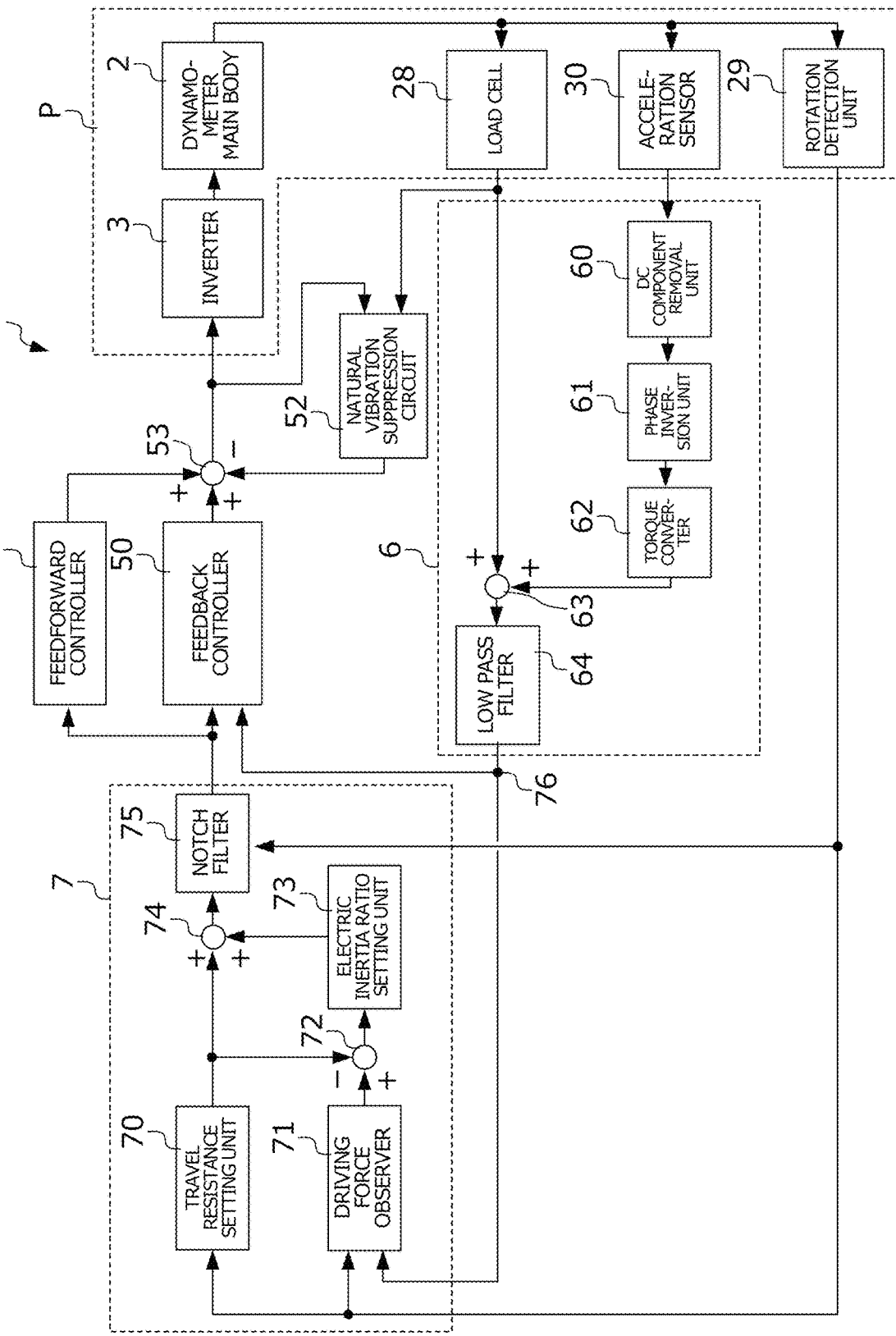
FIG. 2 is a block diagram illustrating a configuration of a control device according to a first example.

FIG. 2 is a block diagram illustrating a configuration of the control device 4 of the dynamometer system according to the first example. In FIG. 2, a control target P of the control device 4 includes the inverter 3, the dynamometer main body 2, the load cell 28, the acceleration sensor 30, the speed detection device 29, and the like described with reference to FIG. 1.

The control device 4 includes a feedback controller 50, a feedforward controller 51, a natural vibration suppression circuit 52, an inverter input generation unit 53, a torque detection circuit 6, and a command generation unit 7.

The torque detection circuit 6 generates a torque detection signal corresponding to the torque generated in the oscillator of the dynamometer main body, based on the load cell detection signal outputted from the load cell 28 and the acceleration detection signal outputted from the acceleration sensor 30.

More specifically, the torque detection circuit 6 includes a DC component removal unit 60 that removes a DC component having a frequency equal to or lower than a predetermined frequency from the acceleration detection signal, a phase inversion unit 61 that inverts the phase of the acceleration detection signal having passed through the DC component removal unit 60 with respect to the load cell detection signal by 180 degrees, a torque conversion unit 62 that converts the acceleration detection signal having passed through the phase inversion unit 61 into a torque signal by multiplying the acceleration detection signal by a predetermined coefficient, an adder 63 that adds a torque signal outputted from the torque conversion unit 62 to the load cell detection signal to remove a torque pulsation component caused by the inverter 3 from the load cell detection signal, and a low-pass filter 64 that removes harmonic noise from the load cell detection signal having passed through the adder 63 and outputs a torque detection signal.

The feedback controller 50 calculates a deviation between a detection signal, which is either the torque detection signal outputted from the torque detection circuit 6 or the speed detection signal outputted from the speed detection device 29, and a command signal (hereinafter referred to as a "feedback command signal") for the detection signal, and generates a feedback input signal that eliminates the deviation based on a known feedback algorithm. In the present example, a case where the feedback controller 50 is a torque controller that generates a feedback input signal so as to eliminate the deviation between the torque detection signal and the feedback command signal generated by the command generation unit 7 for the torque detection signal will be described.

The feedforward controller 51 generates a feedforward input signal by performing a predetermined operation based on the feedforward command signal generated by the command generation unit 7. In the present example, a case where the feedback command signal inputted to the feedback controller 50 is inputted to the feedforward controller 51 as a feedforward command signal will be described; however, the present invention is not limited thereto.

The inverter input generation unit 53 generates an inverter input signal based on the feedback input signal, the feedforward input signal, and the correction signal generated by the natural vibration suppression circuit 52, and inputs the inverter input signal to the inverter 3. More specifically, the inverter input generation unit 53 generates the inverter input signal by subtracting the correction signal from the sum of the feedback input signal and the feedforward input signal.

The natural vibration suppression circuit 52 generates a correction signal for correcting the feedback input signal outputted from the feedback controller 50 so that the natural vibration of the oscillator is suppressed based on the inverter input signal outputted from the inverter input generation unit 53 and the load cell detection signal that has not passed through the torque detection circuit 6. More specifically, the natural vibration suppression circuit 52 generates an approximate signal of the load cell by using an arithmetic expression characterized by a predetermined damping coefficient and the natural frequency of the oscillator, and generates a correction signal so as to minimize a deviation between a signal obtained by delaying the approximate signal by a predetermined dead time and the load cell torque signal. A specific configuration for generating the correction signal having such a function is described in, for example, Japanese Unexamined Patent Application, Publication No. 2013-246152 by the applicant of the present application, and thus a detailed description thereof will be omitted here.

The command generation unit 7 generates a feedback command signal for the feedback controller 50 and a feedforward command signal for the feedforward controller 51 based on the torque detection signal and the speed detection signal. As described above, in the present example, a case where the feedback command signal is used as a feedforward command signal will be described; however, the present invention is not limited thereto.

The command generation unit 7 includes a travel resistance setting unit 70, a driving force observer 71, a subtractor 72, an electric inertia ratio setting unit 73, an adder 74, and a notch filter 75.

The travel resistance setting unit 70 generates a travel resistance setting signal corresponding to the speed detection signal by searching a predetermined travel resistance table based on the speed detection signal. This travel resistance setting signal is a signal corresponding to the resistance that the travelling vehicle receives from the road surface and the atmosphere. As the travel resistance table, a travel resistance table determined by performing a test using an actual vehicle is used.

The driving force observer 71 generates a driving force estimation signal corresponding to the driving force applied to the dynamometer main body 2 based on the torque detection signal and the speed detection signal. More specifically, the driving force observer 71 generates a driving force estimation signal by combining a torque detection signal and a signal obtained by multiplying a differential value of the speed detection signal by a value of a predetermined fixed inertial mass. Here, the fixed inertial mass refers to an inertial property amount unique to the dynamometer system, and corresponds to a fixed inertia component automatically added to a vehicle traveling on a roller.

The subtractor 72 subtracts the travel resistance setting signal generated by the travel resistance setting unit 70 from the driving force estimation signal generated by the driving force observer 71. The electric inertia ratio setting unit 73 generates an electric inertial command signal by multiplying the signal generated by the subtractor 72 by a ratio of a predetermined electric inertial mass value to a predetermined set inertial mass value (electric inertial mass value/set inertial mass value). As shown in the following expression, the set inertial mass is defined by a combination of a fixed inertial mass and an electric inertial mass. Set inertial mass=fixed inertial mass+electric inertial mass The adder 74 adds the travel resistance setting signal generated by the travel resistance setting unit 70 and the electric inertia command signal generated by the electric inertia ratio setting unit 73 to generate a feedback command signal for the feedback controller 50 and the feedforward controller 51.

The notch filter 75 performs band stop processing on the feedback command signal outputted from the adder 74 to attenuate a component within a predetermined stop band and to pass a component outside the stop band. The feedback command signal subjected to the band stop processing by the notch filter 75 is inputted to the feedback controller 50 and the feedforward controller 51.

The transfer function G(s) of the notch filter 75 is expressed by the following expression (1). In the following equation expression (1), "s" is a Laplace operator, "ωn" is the center frequency of the stop band, "ξ" is the width of the stop band, and "d" corresponds to the depth of the stop band. That is, when setting d=0.1, the attenuation amount at the center frequency by the band stop processing is −20 [dB], and when setting d=0.01, the attenuation amount at the center frequency by the band stop processing is −40 [dB].

[Math. 1]

$$G(s) = \frac{s^2 + d \cdot 2\zeta\omega n + \omega n^2}{s^2 + 2\zeta\omega n + \omega n^2} \quad (1)$$

The center frequency ωn of the stop band in the band stop processing by the notch filter 75 is variably set to a magnitude proportional to, for example, the rotation speed ωdy of the dynamometer main body 2 detected by the speed detection device 29. More specifically, the center frequency ωn of the stop band is variably set to a value obtained by multiplying the rotation speed ωdy by a predetermined order k (a predetermined positive integer) as shown in the following expression (2). In the present example, a case where the center frequency ωn of the stop band is variably set to a magnitude proportional to the rotation speed ωdy in order to suppress the influence of vibration caused by the eccentricity of the output shaft 22 to which the speed detection device 29 is attached will be described; however, the present invention is not limited thereto. The center frequency ωn of the stop band may be a predetermined fixed value.

[Math. 2]

$$\omega n = k \cdot \omega dy \quad (2)$$

In the present example, a case will be described in which one notch filter 75 is provided in a signal line connecting the adder 74 to the feedback controller 50 and the feedforward controller 51 to perform the band stop processing on both the travel resistance setting signal and the driving force estimation signal generated based on the speed detection signal and the torque detection signal; however, the number and positions of the notch filters are not limited thereto. For example, by providing a first notch filter having the same function as the notch filter 75 on the signal line connecting the travel resistance setting unit 70 and the adder 74 and providing a second notch filter having the same function as the notch filter 75 in the signal line connecting the driving force observer 71 and the subtractor 72, the band stop processing may be performed on both the travel resistance setting signal and the driving force estimation signal generated based on the speed detection signal and the torque detection signal.

Further, for example, by providing a first notch filter having the same function as the notch filter 75 in the signal line connecting the speed detection device 29, and the travel resistance setting unit 70 and the driving force observer 71, and a second notch filter having the same function as the notch filter 75 in the signal line connecting the torque detection circuit 6 and the driving force observer 71, the band stop processing may be performed on both the speed detection signal and the torque detection signal inputted to the travel resistance setting unit 70 and the driving force observer 71. However, in this case, when the torque detection signal subjected to the band stop processing is inputted to the feedback controller 50, the torque control function of the feedback controller 50 may not operate appropriately. Therefore, it is preferable that the second notch filter is provided closer to the driving force observer 71 than the branch point 76 connected to the feedback controller 50 among the signal lines connecting the torque detection circuit 6 and the driving force observer 71. In other words, it is preferable that the torque detection signal inputted to the feedback controller 50 is not subjected to the band stop processing.

As described above, the command generation unit 7 generates the feedback input signal for the feedback controller 50 and the feedforward input signal for the feedforward controller 51 from the speed detection signal, the torque detection signal, or a signal generated based on at least one of the speed detection signal or the torque detection signal, through the band stop processing.

According to the control device 4 of the present example, the following advantageous effects are achieved.

(1) The dynamometer system 1 includes the oscillating dynamometer main body 2, the inverter 3 that supplies electric power corresponding to an inverter input signal to the dynamometer main body 2, and the control device 4 that generates an inverter input signal based on a torque detection signal and a speed detection signal. In addition, the control device 4 includes the feedback controller 50 that generates a feedback input signal based on a deviation between the torque detection signal and the feedback command signal for the torque detection signal, the command generation unit 7 that generates a feedback command signal for the feedback controller 50, the natural vibration suppression circuit 52 that generates a correction signal for the feedback input signal so that the natural vibration of the oscillator is suppressed, and the inverter input generation unit 53 that generates an inverter input signal based on the feedback input signal and the correction signal. As described above, the control device 4 generates the correction signal for the feedback input signal using the natural vibration suppression circuit 52, and generates the inverter input signal using the feedback input signal and the correction signal, thereby making it possible to suppress the natural vibration of the oscillator.

Figure 3A:
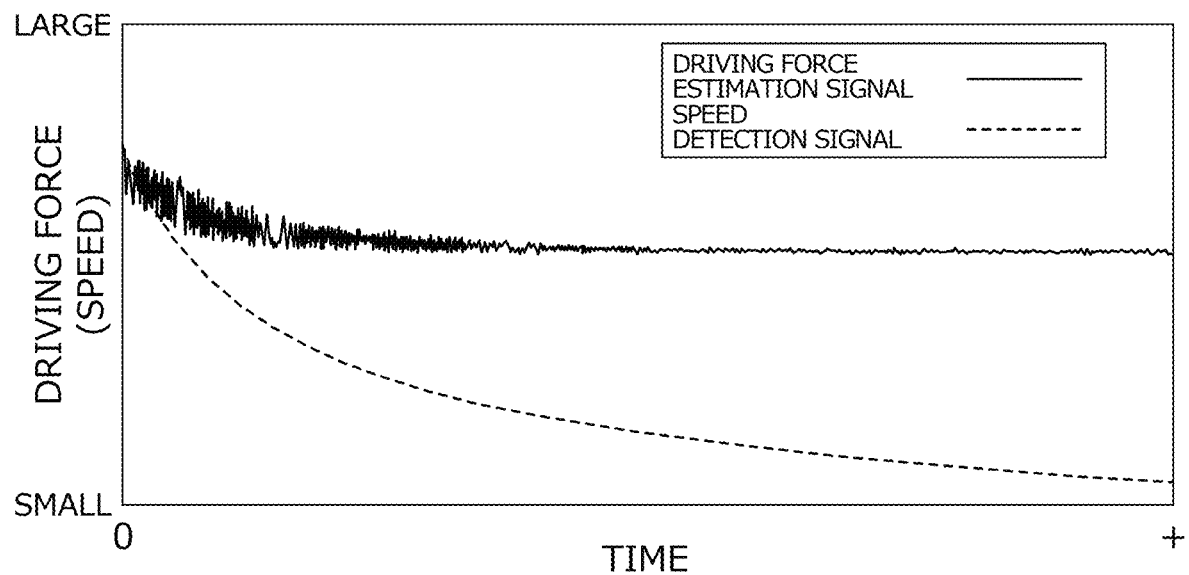
FIG. 3A is a diagram showing changes in a driving force estimation signal and a speed detection signal generated in a control device of a conventional dynamometer system.
Figure 3B:
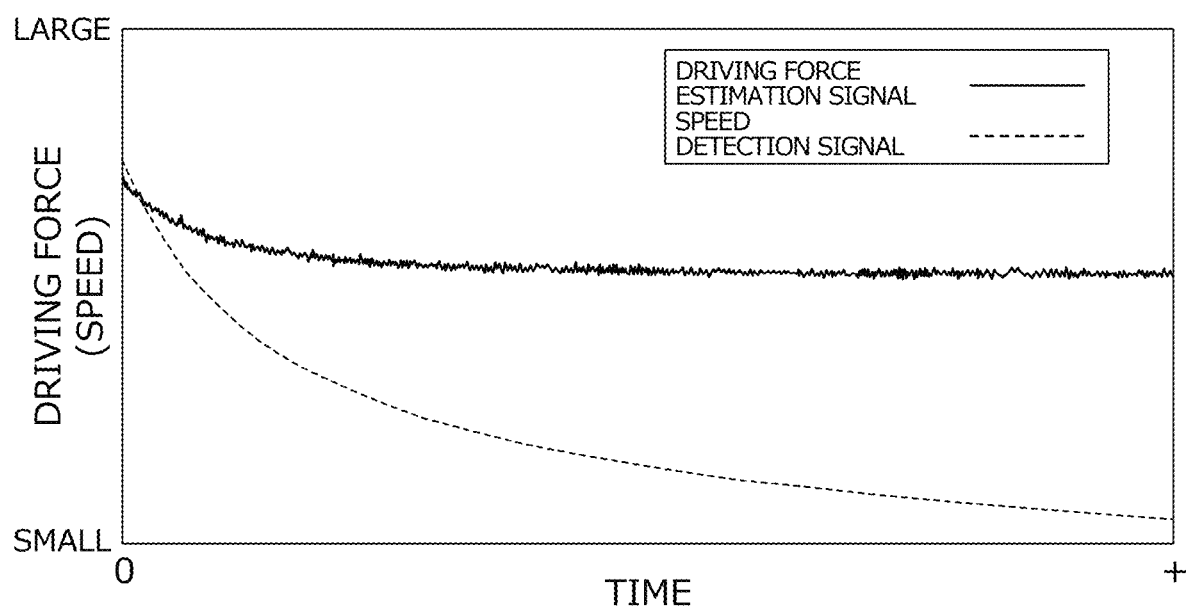
FIG. 3B is a diagram illustrating changes in a driving force estimation signal and a speed detection signal generated in a control device according to the present example.

FIG. 3A is a diagram showing changes in the driving force estimation signal and the speed detection signal generated in the control device of the conventional dynamometer system, and FIG. 3B is a diagram showing changes in the driving force estimation signal and the speed detection signal generated in the control device 4 of the present example. Here, the control device of the conventional dynamometer system refers to the control device described in Japanese Unexamined Patent Application, Publication No. 2016-70786 by the applicant of the present application, and differs from the control device 4 of the present example in that the feedback command signal is not generated through the band stop processing.

In FIGS. 3A and 3B, the speed detection signal appears to change smoothly, but the actual speed detection signal slightly oscillates due to the influence of the eccentricity of the output shaft 22 to which the speed detection device 29 is attached. Therefore, in the control device of the conventional dynamometer system in which the band stop processing is not performed, the vibration is amplified by the feedback controller 50 and the feedforward controller 51, and the driving force estimation signal may greatly oscillate as shown in FIG. 3A. On the other hand, in the dynamometer system 1, the command generation unit 7 generates the feedback input signal from the speed detection signal, the torque detection signal, or a signal generated based on at least one of the speed detection signal or the torque detection signal, through the band stop processing that attenuates the component within a predetermined stop band and allowing the components outside the stop band to pass through. With such a configuration, since the control device 4 can selectively attenuate the fluctuation component in the stop band from the feedback command signal inputted to the feedback controller 50, it is possible to realize the control of the dynamometer main body 2 in which the influence of the vibration due to the natural vibration of the oscillator and a mechanical device different from the natural vibration (in a case of the present example, the eccentricity of the output shaft 22) is suppressed. Therefore, as shown in FIG. 3B, vibration of the driving force estimation signal generated by the driving force observer 71 is also suppressed.

(2) According to the dynamometer system 1, by variably setting the center frequency of the stop band to a magnitude proportional to the rotation speed, for example, it is possible to suppress the influence of vibration generated in the speed detection signal and the torque detection signal due to the eccentricity of the output shaft 22 to which the speed detection device 29 is attached.

(3) In the dynamometer system 1, the command generation unit 7 includes the driving force observer 71 that generates a driving force estimation signal based on the speed detection signal and the torque detection signal, the travel resistance setting unit 70 that generates a travel resistance setting signal based on the speed detection signal, and the notch filter 75 that performs the band stop processing on the driving force estimation signal and the travel resistance setting signal. According to the dynamometer system 1, by performing the band stop processing on the driving force estimation signal and the travel resistance setting signal used for generating the feedback command signal in the command generation unit 7, it is possible to selectively attenuate the fluctuation component in the stop band from the feedback command signal inputted to the feedback controller 50, and thus it is possible to realize control of the dynamometer main body 2 in which the influence of vibration caused by a mechanical device different from the natural vibration of the oscillator is suppressed. As described above, even when the first notch filter that performs the band stop processing on the speed detection signal inputted to the driving force observer 71 and the travel resistance setting unit 70 and the second notch filter that performs the band stop processing on the torque detection signal inputted to the driving force observer are provided, the same advantageous effect can be obtained.

SECOND EXAMPLE

Figure 4:
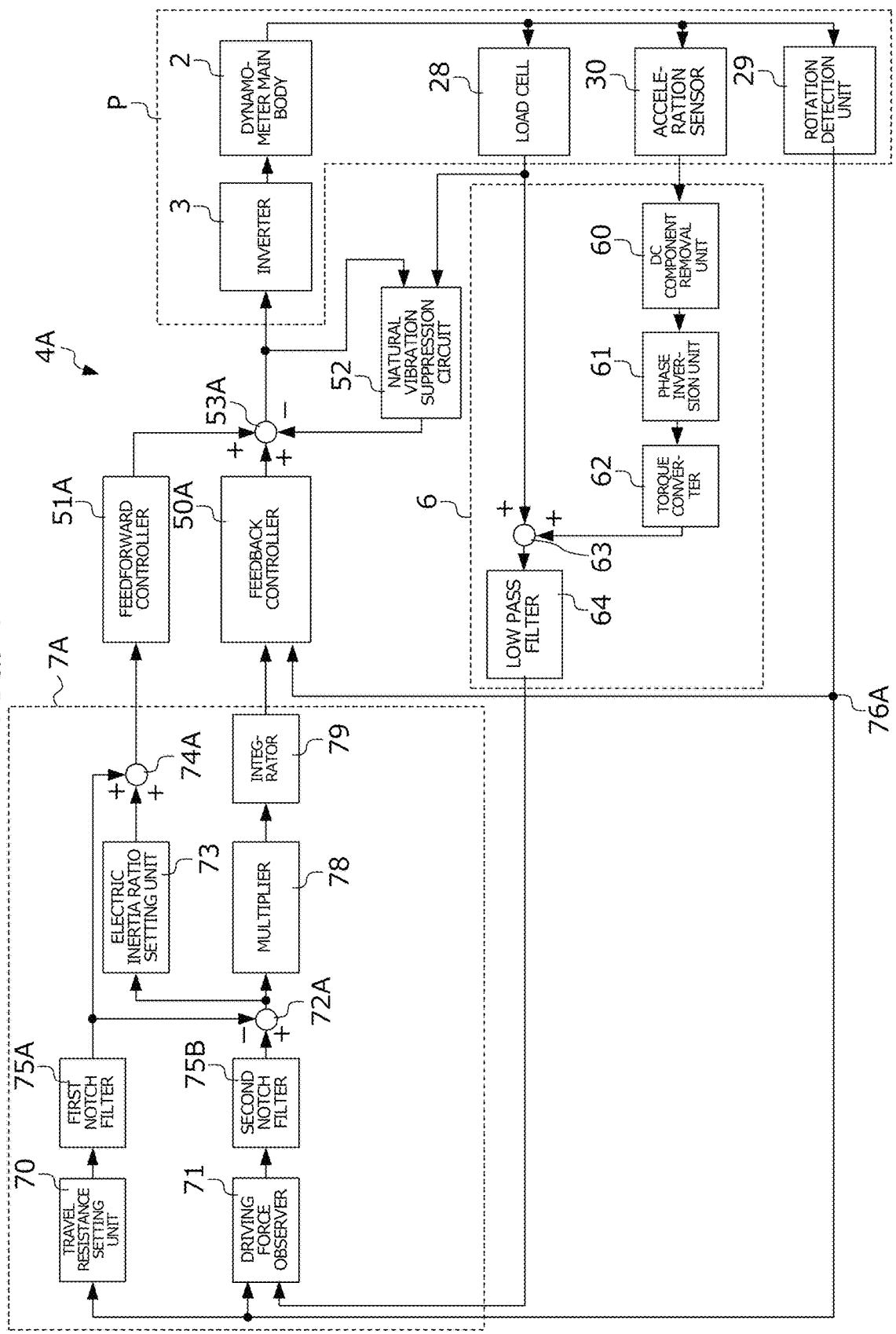
FIG. 4 is a block diagram illustrating a configuration of a control device according to a second example.

FIG. 4 is a block diagram illustrating a configuration of a control device 4A of the dynamometer system according to the second example. The control device 4A of the present example is different from the control device 4 of the first example (see FIG. 2) in the configurations of a feedback controller 50A, a feedforward controller 51A, an inverter input generation unit 53A, and a command generation unit 7A. Hereinafter, the same components as those of the control device 4 of the first example are denoted by the same reference numerals, and the descriptions thereof will be omitted.

The feedback controller 50A calculates the deviation between a detection signal, which is either a torque detection signal outputted from the torque detection circuit 6 or a speed detection signal outputted from the speed detection device 29, and a feedback command signal for this detection signal, and generates a feedback input signal that eliminates the deviation based on a known feedback algorithm. In the present example, a case where the feedback controller 50A is a speed controller that generates a feedback input signal so as to eliminate the deviation between a speed detection signal and a feedback command signal generated by the command generation unit 7A for this speed detection signal will be described.

The feedforward controller 51A generates a feedforward input signal by performing a predetermined operation based on the feedforward command signal generated by the command generation unit 7A.

The inverter input generation unit 53A generates an inverter input signal based on the feedback input signal, the feedforward input signal, and the correction signal generated by the natural vibration suppression circuit 52, and inputs the inverter input signal to the inverter 3. More specifically, the inverter input generation unit 53A generates the inverter input signal by subtracting the correction signal from the sum of the feedback input signal and the feedforward input signal.

The command generation unit 7A generates a feedback command signal for the feedback controller 50A and a feedforward command signal for the feedforward controller 51A based on the torque detection signal and the speed detection signal.

The command generation unit 7A includes the travel resistance setting unit 70, the driving force observer 71, a subtractor 72A, the electric inertia ratio setting unit 73, an adder 74A, a first notch filter 75A, a second notch filter 75B, a multiplier 78, and an integrator 79.

The first notch filter 75A performs the band stop processing that attenuates a component within a predetermined stop band and allows components outside the stop band to pass, for the travel resistance setting signal generated by the travel resistance setting unit 70. The travel resistance setting signal subjected to the band stop processing by the first notch filter 75A is inputted to the subtractor 72A and the adder 74A.

The second notch filter 75B performs the band stop processing that attenuates a component within a predetermined stop band and allows components outside the stop band to pass, for the driving force estimation signal generated by the driving force observer 71. The driving force estimation signal subjected to the band stop processing by the second notch filter 75B is inputted to the subtractor 72A.

In addition, the plurality of parameters "ξ", "d", "ωn", and "k" characterizing the band stop processing by the first notch filter 75A and the second notch filter 75B are set in the same manner as in the notch filter 75 of the first example, and thus detailed descriptions thereof will be omitted.

The subtractor 72A subtracts the travel resistance setting signal subjected to the band stop processing by the first notch filter 75A from the driving force estimation signal subjected to the band stop processing by the second notch filter 75B.

The multiplier 78 multiplies the signal generated by the subtractor 72A by the reciprocal number of the set inertial mass (1/set inertial mass). The integrator 79 integrates the signal generated by the multiplier 78 to generate a feedback command signal for the feedback controller 50A. The adder 74A generates a feedforward command signal for the feedforward controller 51A by adding the travel resistance setting signal subjected to the band stop processing by the first notch filter 75A and the electric inertia command signal generated by the electric inertia ratio setting unit 73.

In the present example, a case is described where the first notch filter 75A is provided in the signal line connecting the travel resistance setting unit 70, the subtractor 72A, and the adder 74A, and the second notch filter 75B is provided in the signal line connecting the driving force observer 71 and the subtractor 72A, so that the band stop processing is performed on both the travel resistance setting signal and the driving force estimation signal generated based on the speed detection signal and the torque detection signal; however, the number and the position of the notch filters are not limited thereto. For example, by providing the first notch filter 75A in the signal line connecting the adder 74A and the feedforward controller 51A and providing the second notch filter 75B in the signal line connecting the integrator 79 and the feedback controller 50A, the band stop processing may be performed on both the travel resistance setting signal and the driving force estimation signal generated based on the speed detection signal and the torque detection signal.

Further, for example, the band stop processing may be performed on both the speed detection signal and the torque detection signal inputted to the travel resistance setting unit 70 and the driving force observer 71 by providing the first notch filter 75A in the signal line connecting the speed detection device 29, the travel resistance setting unit 70, and the driving force observer 71, and providing the second notch filter 75B in the signal line connecting the torque detection circuit 6 and the driving force observer 71. However, in this case, when the speed detection signal subjected to the band stop processing is inputted to the feedback controller 50A, the speed control function of the feedback controller 50A may not operate appropriately. Therefore, it is preferable that the first notch filter 57A is provided closer to the travel resistance setting unit 70 and the driving force observer 71 than a branch point 76A connected to the feedback controller 50A among the signal lines connecting the speed detection device 29 to the travel resistance setting unit 70 and the driving force observer 71. In other words, it is preferable that the speed detection signal inputted to the feedback controller 50A is not subjected to the band stop processing.

According to the control device 4A of the present example, even when the feedback controller 50A is a speed controller, it is possible to achieve the same advantageous effects as (1) to (3) described above.

EXPLANATION OF REFERENCE NUMERALS

1 . . . Dynamometer main system
2 . . . Dynamometer main body
21 . . . Oscillator
22 . . . Output shaft
26 . . . Torque arm
28 . . . Load cell (torque detection device)
29 . . . Speed detection device
30 . . . Acceleration sensor (torque detection device)
3 . . . Inverter
4, 4A . . . Control device
50, 50A . . . Feedback Controller
51, 51A . . . Feedforward controller
52 . . . Natural vibration suppression circuit
53, 53A . . . Inverter input generation unit
6 . . . Torque detection circuit (torque detection device)
7, 7A . . . Command generation unit
70 . . . Travel resistance setting unit
71 . . . Driving force observer
72, 72A . . . Subtractor
73 . . . Electric inertia ratio setting unit
74, 74A . . . Adder
75 . . . Notch filter
75A . . . First notch filter
75B . . . Second notch filter
78 . . . Multiplier
79 . . . Integrator

The invention claimed is:

1. A dynamometer system comprising:
an oscillating dynamometer main body;
an inverter that supplies electric power corresponding to an inverter input signal to the oscillating dynamometer main body;
a torque detector that generates a torque detection signal corresponding to a torque generated in an oscillator of the oscillating dynamometer main body;
a speed detector that generates a speed detection signal corresponding to a rotation speed of an output shaft of the oscillating dynamometer main body; and
a controller that generates the inverter input signal based on the torque detection signal and the speed detection signal, and inputs the inverter input signal to the inverter,
wherein the controller includes:
a feedback controller that generates a feedback input signal based on a deviation between a detection signal, which is either one of the torque detection signal or the speed detection signal, and a feedback command signal for the detection signal;
a natural vibration suppression circuit that generates a correction signal for the feedback input signal to suppress a natural vibration of the oscillator based on the inverter input signal;
an inverter input generator that generates the inverter input signal based on the feedback input signal and the correction signal; and
a command generator that generates the feedback command signal based on the torque detection signal and the speed detection signal,
wherein the command generator generates the feedback command signal from a signal generated based on both the speed detection signal and the torque detection signal through band stop processing that attenuates a component within a predetermined stop band and allows a component outside the predetermined stop band to pass through.

2. The dynamometer system according to claim 1, wherein a center frequency of the predetermined stop band is variably set to a magnitude proportional to the rotation speed.

3. The dynamometer system according to claim 2, wherein the command generator includes a driving force observer that generates a driving force estimation signal corresponding to a driving force applied to the oscillating dynamometer main body based on the speed detection signal and the torque detection signal, a travel resistance setting unit that generates a travel resistance setting signal based on the speed detection signal, and at least one notch filter that performs the band stop processing on the driving force estimation signal and the travel resistance setting signal.

4. The dynamometer system according to claim 1, wherein the command generator includes a driving force observer that generates a driving force estimation signal corresponding to a driving force applied to the oscillating dynamometer main body based on the speed detection signal and the torque detection signal, a travel resistance setting unit that generates a travel resistance setting signal based on the speed detection signal, and at least one notch filter that performs the band stop processing on the driving force estimation signal and the travel resistance setting signal.

5. A dynamometer system comprising:
an oscillating dynamometer main body;
an inverter that supplies electric power corresponding to an inverter input signal to the oscillating dynamometer main body;
a torque detector that generates a torque detection signal corresponding to a torque generated in an oscillator of the oscillating dynamometer main body;
a speed detector that generates a speed detection signal corresponding to a rotation speed of an output shaft of the oscillating dynamometer main body; and
a controller that generates the inverter input signal based on the torque detection signal and the speed detection signal, and inputs the inverter input signal to the inverter,
wherein the controller includes:
a feedback controller that generates a feedback input signal based on a deviation between a detection signal, which is either one of the torque detection signal or the speed detection signal, and a feedback command signal for the detection signal;
a natural vibration suppression circuit that generates a correction signal for the feedback input signal to suppress a natural vibration of the oscillator based on the inverter input signal;
an inverter input generator that generates the inverter input signal based on the feedback input signal and the correction signal; and
a command generator that generates the feedback command signal based on the torque detection signal and the speed detection signal,
wherein the command generator generates the feedback command signal from a travel resistance setting signal generated based on the speed detection signal and a driving force estimation signal generated based on the speed detection signal and the torque detection signal through band stop processing that attenuates a component within a predetermined stop band and allows a component outside the predetermined stop band to pass through.

6. The dynamometer system according to claim 5, wherein the command generator includes a driving force observer that generates the driving force estimation signal corresponding to a driving force applied to the oscillating dynamometer main body based on the speed detection signal and the torque detection signal, a travel resistance setting unit that generates the travel resistance setting signal based on the speed detection signal, a first notch filter that performs the band stop processing on the speed detection signal inputted to the driving force observer and the travel resistance setting unit, and a second notch filter that performs the band stop processing on the torque detection signal inputted to the driving force observer.

7. The dynamometer system according to claim 5, wherein a center frequency of the predetermined stop band is variably set to a magnitude proportional to the rotation speed.

8. The dynamometer system according to claim 7, wherein the command generator includes a driving force observer that generates the driving force estimation signal corresponding to a driving force applied to the oscillating dynamometer main body based on the speed detection signal and the torque detection signal, a travel resistance setting unit that generates the travel resistance setting signal based on the speed detection signal, a first notch filter that performs the band stop processing on the speed detection signal inputted to the driving force observer and the travel resistance setting unit, and a second notch filter that performs the band stop processing on the torque detection signal inputted to the driving force observer.

9. A dynamometer system comprising:
an oscillating dynamometer main body;
an inverter that supplies electric power corresponding to an inverter input signal to the oscillating dynamometer main body;
a torque detector that generates a torque detection signal corresponding to a torque generated in an oscillator of the oscillating dynamometer main body;
a speed detector that generates a speed detection signal corresponding to a rotation speed of an output shaft of the oscillating dynamometer main body; and
a controller that generates the inverter input signal based on the torque detection signal and the speed detection signal, and inputs the inverter input signal to the inverter,
wherein the controller includes:
a feedback controller that generates a feedback input signal based on a deviation between a detection signal, which is either one of the torque detection signal or the speed detection signal, and a feedback command signal for the detection signal;
a natural vibration suppression circuit that generates a correction signal for the feedback input signal to suppress a natural vibration of the oscillator based on the inverter input signal;
an inverter input generator that generates the inverter input signal based on the feedback input signal and the correction signal; and
a command generator that generates the feedback command signal based on the torque detection signal and the speed detection signal,
wherein the command generator generates the feedback command signal from both the speed detection signal and the torque detection signal through band stop processing that attenuates a component within a predetermined stop band and allows a component outside the predetermined stop band to pass through.

10. The dynamometer system according to claim 9, wherein a center frequency of the predetermined stop band is variably set to a magnitude proportional to the rotation speed.

* * * * *